US011909631B1

(12) United States Patent
Garcarz et al.

(10) Patent No.: US 11,909,631 B1
(45) Date of Patent: Feb. 20, 2024

(54) IDENTIFYING APPLICATION QOE CHANGES DUE TO APPLICATION LOCATION MIGRATION

(71) Applicant: Cisco Technology, Inc., San Jose, CA (US)

(72) Inventors: Michal Wladyslaw Garcarz, Cracow (PL); Jean-Philippe Vasseur, Saint Martin d'Uriage (FR); Vinay Kumar Kolar, San Jose, CA (US)

(73) Assignee: CISCO TECHNOLOGY, INC., San Jose, CA (US)

( * ) Notice: Subject to any disclaimer, the term of this patent is extended or adjusted under 35 U.S.C. 154(b) by 18 days.

(21) Appl. No.: 17/877,482

(22) Filed: Jul. 29, 2022

(51) Int. Cl.
*H04L 45/302* (2022.01)
*H04L 45/24* (2022.01)
*H04L 45/12* (2022.01)

(52) U.S. Cl.
CPC .......... *H04L 45/302* (2013.01); *H04L 45/123* (2013.01); *H04L 45/24* (2013.01)

(58) Field of Classification Search
CPC ...... H04L 45/123; H04L 45/24; H04L 45/302
See application file for complete search history.

(56) References Cited

U.S. PATENT DOCUMENTS

| 8,751,627 | B2* | 6/2014 | Liu | G06F 9/5088 |
| | | | | 709/224 |
| 9,948,669 | B2* | 4/2018 | Liu | H04L 63/1408 |
| 10,511,708 | B2* | 12/2019 | Rangarajan | H04L 41/5025 |
| 10,728,117 | B1 | 7/2020 | Sharma et al. | |
| 10,862,771 | B2 | 12/2020 | Tomkins et al. | |
| 10,958,705 | B2 | 3/2021 | Momchilov et al. | |
| 11,115,347 | B2* | 9/2021 | Gupta | H04L 45/24 |
| 11,677,661 | B2* | 6/2023 | Garcarz | H04L 45/22 |
| | | | | 370/235 |
| 2018/0091990 | A1 | 3/2018 | Yamanaka et al. | |
| 2019/0386904 | A1* | 12/2019 | Srivatsan | H04L 43/087 |

(Continued)

FOREIGN PATENT DOCUMENTS

JP 2022104045 A * 7/2022

OTHER PUBLICATIONS

Shalini Choudhury et al. "ShareOn: Shared Resource Dynamic Container Migration Framework for Real-Time Support in Mobile Edge Clouds", WINLAB, Rutgers University, Jun. 2022, 16 pages. (Year: 2022).*

(Continued)

*Primary Examiner* — George C Neurauter, Jr.
(74) *Attorney, Agent, or Firm* — BEHMKE INNOVATION GROUP LLC; James M. Behmke; James J. Wong

(57) ABSTRACT

In one embodiment, a device generates an application map for an online application accessed via a network that indicates a set of network addresses at which the online application was accessed, client information for clients that accessed the online application via the network, and quality of experience metrics for the online application. The device identifies a location change of the online application by tracking changes to the application map. The device determines a correlation between the location change and a degradation in the quality of experience metrics. The device adjusts, based on the correlation, routing of traffic associated with the online application in the network.

20 Claims, 12 Drawing Sheets

(56) References Cited

U.S. PATENT DOCUMENTS

2020/0153701 A1* 5/2020 Mohan ................ H04L 41/5009
2023/0018772 A1* 1/2023 Kolar .................. H04L 41/0631

OTHER PUBLICATIONS

Sumit Maheshwari et al. "Traffic-Aware Dynamic Container Migration for Real-Time Support in Mobile Edge Clouds", 2018 IEEE International Conference on Advanced Networks and Telecommunications Systems (ANTS), 6 pages. (Year: 2018).*

"Office 365 URLs and IP Address Ranges", online, Jul. 22, 2022, accessed Jul. 27, 2022, 12 pages, Microsoft 365 Enterprise, Microsoft Docs.

"AWS X-Ray—Distributed Tracing System", online: accessed Jul. 27, 2022, 9 pages, Amazon Web Services.

* cited by examiner

IDENTIFYING APPLICATION QOE CHANGES DUE TO APPLICATION LOCATION MIGRATION

TECHNICAL FIELD

The present disclosure relates generally to computer networks, and, more particularly, to identifying application quality of experience (QoE) changes due to application location migration.

BACKGROUND

Software-defined wide area networks (SD-WANs) represent the application of software-defined networking (SDN) principles to WAN connections, such as connections to cellular networks, the Internet, and Multiprotocol Label Switching (MPLS) networks. The power of SD-WAN is the ability to provide consistent service level agreement (SLA) for important application traffic transparently across various underlying tunnels of varying transport quality and allow for seamless tunnel selection based on tunnel performance characteristics that can match application SLAs and satisfy the quality of service (QoS) requirements of the traffic (e.g., in terms of delay/latency, jitter, packet loss, etc.).

One factor that can affect the application experience of an online application is the point of presence (PoP) that is used to access the application. Typically, the closest PoP selected based on its location and proximity to the edge device connecting to it, under the assumption that this PoP offers the best performance, which is not always the case. Indeed, the performance of the PoP used to access a cloud-hosted application can change over time, leading to decreased performance and lowered quality of experience for the user. This is especially true in instances in which an application migrates over time, such as between different clouds and cloud native services.

BRIEF DESCRIPTION OF THE DRAWINGS

The embodiments herein may be better understood by referring to the following description in conjunction with the accompanying drawings in which like reference numerals indicate identically or functionally similar elements, of which.

DESCRIPTION OF EXAMPLE EMBODIMENTS

Overview

Figure 1A:
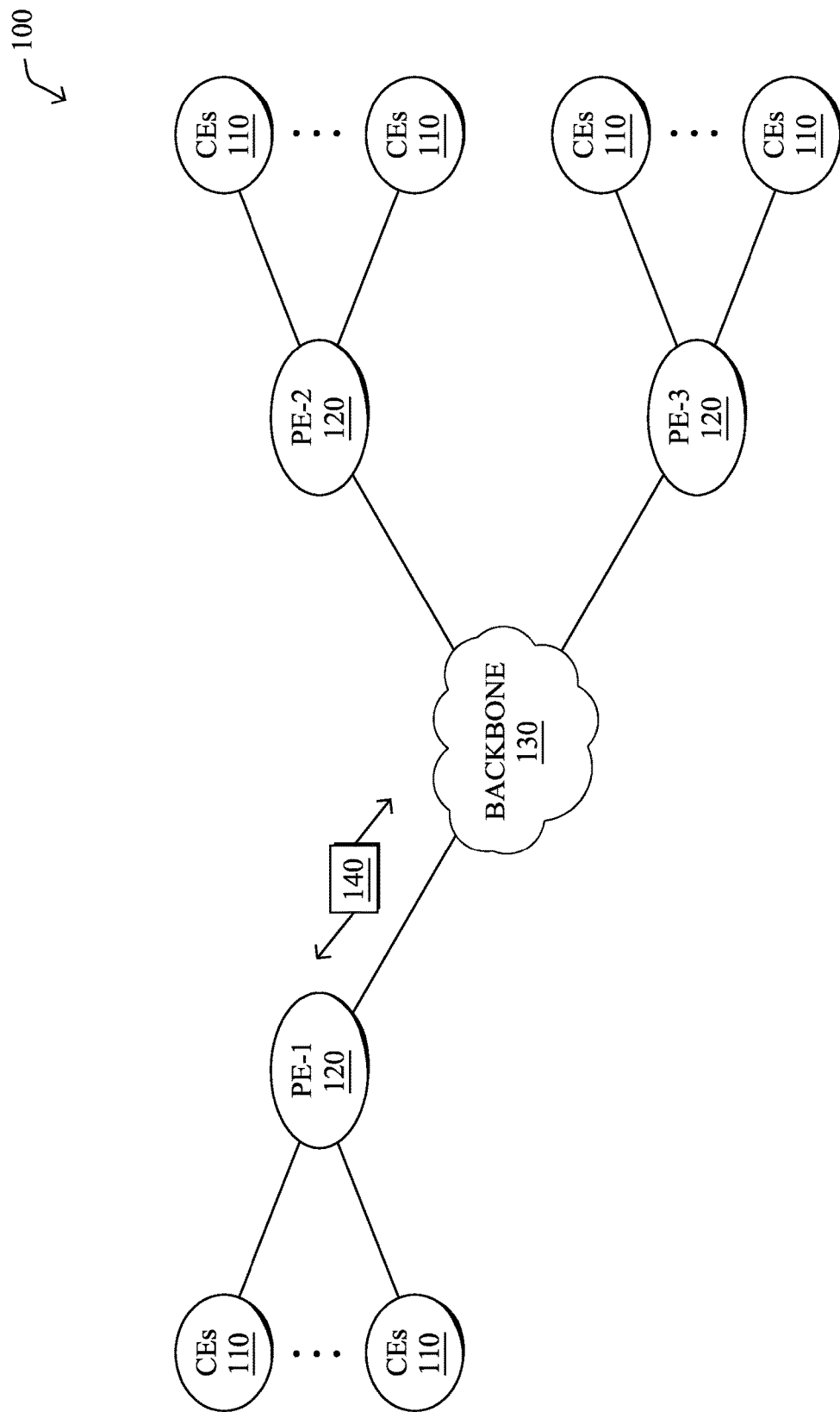
FIGS. 1A-1B illustrate an example communication network.

According to one or more embodiments of the disclosure, a device generates an application map for an online application accessed via a network that indicates a set of network addresses at which the online application was accessed, client information for clients that accessed the online application via the network, and quality of experience metrics for the online application. The device identifies a location change of the online application by tracking changes to the application map. The device determines a correlation between the location change and a degradation in the quality of experience metrics. The device adjusts, based on the correlation, routing of traffic associated with the online application in the network.

Description

A computer network is a geographically distributed collection of nodes interconnected by communication links and segments for transporting data between end nodes, such as personal computers and workstations, or other devices, such as sensors, etc. Many types of networks are available, with the types ranging from local area networks (LANs) to wide area networks (WANs). LANs typically connect the nodes over dedicated private communications links located in the same general physical location, such as a building or campus. WANs, on the other hand, typically connect geographically dispersed nodes over long-distance communications links, such as common carrier telephone lines, optical lightpaths, synchronous optical networks (SONET), or synchronous digital hierarchy (SDH) links, or Powerline Communications (PLC) such as IEEE 61334, IEEE P1901.2, and others. The Internet is an example of a WAN that connects disparate networks throughout the world, providing global communication between nodes on various networks. The nodes typically communicate over the network by exchanging discrete frames or packets of data according to predefined protocols, such as the Transmission Control Protocol/Internet Protocol (TCP/IP). In this context, a protocol consists of a set of rules defining how the nodes interact with each other. Computer networks may be further interconnected by an intermediate network node, such as a router, to extend the effective "size" of each network.

Smart object networks, such as sensor networks, in particular, are a specific type of network having spatially distributed autonomous devices such as sensors, actuators, etc., that cooperatively monitor physical or environmental conditions at different locations, such as, e.g., energy/power consumption, resource consumption (e.g., water/gas/etc. for advanced metering infrastructure or "AMI" applications) temperature, pressure, vibration, sound, radiation, motion, pollutants, etc. Other types of smart objects include actuators, e.g., responsible for turning on/off an engine or perform any other actions. Sensor networks, a type of smart object network, are typically shared-media networks, such as wireless or PLC networks. That is, in addition to one or more sensors, each sensor device (node) in a sensor network may generally be equipped with a radio transceiver or other communication port such as PLC, a microcontroller, and an energy source, such as a battery. Often, smart object networks are considered field area networks (FANs), neighborhood area networks (NANs), personal area networks (PANs), etc. Generally, size and cost constraints on smart object nodes (e.g., sensors) result in corresponding constraints on resources such as energy, memory, computational speed and bandwidth.

FIG. 1A is a schematic block diagram of an example computer network 100 illustratively comprising nodes/devices, such as a plurality of routers/devices interconnected by links or networks, as shown. For example, customer edge (CE) routers 110 may be interconnected with provider edge (PE) routers 120 (e.g., PE-1, PE-2, and PE-3) in order to communicate across a core network, such as an illustrative network backbone 130. For example, routers 110, 120 may be interconnected by the public Internet, a multiprotocol label switching (MPLS) virtual private network (VPN), or the like. Data packets 140 (e.g., traffic/messages) may be exchanged among the nodes/devices of the computer network 100 over links using predefined network communication protocols such as the Transmission Control Protocol/Internet Protocol (TCP/IP), User Datagram Protocol (UDP), Asynchronous Transfer Mode (ATM) protocol, Frame Relay protocol, or any other suitable protocol. Those skilled in the art will understand that any number of nodes, devices, links, etc. may be used in the computer network, and that the view shown herein is for simplicity.

In some implementations, a router or a set of routers may be connected to a private network (e.g., dedicated leased lines, an optical network, etc.) or a virtual private network (VPN), such as an MPLS VPN thanks to a carrier network, via one or more links exhibiting very different network and service level agreement characteristics. For the sake of illustration, a given customer site may fall under any of the following categories:

1.) Site Type A: a site connected to the network (e.g., via a private or VPN link) using a single CE router and a single link, with potentially a backup link (e.g., a 3G/4G/5G/LTE backup connection). For example, a particular CE router 110 shown in network 100 may support a given customer site, potentially also with a backup link, such as a wireless connection.

2.) Site Type B: a site connected to the network by the CE router via two primary links (e.g., from different Service Providers), with potentially a backup link (e.g., a 3G/4G/5G/LTE connection). A site of type B may itself be of different types:

2a.) Site Type B1: a site connected to the network using two MPLS VPN links (e.g., from different Service Providers), with potentially a backup link (e.g., a 3G/4G/5G/LTE connection).

2b.) Site Type B2: a site connected to the network using one MPLS VPN link and one link connected to the public Internet, with potentially a backup link (e.g., a 3G/4G/5G/LTE connection). For example, a particular customer site may be connected to network 100 via PE-3 and via a separate Internet connection, potentially also with a wireless backup link.

2c.) Site Type B3: a site connected to the network using two links connected to the public Internet, with potentially a backup link (e.g., a 3G/4G/5G/LTE connection).

Notably, MPLS VPN links are usually tied to a committed service level agreement, whereas Internet links may either have no service level agreement at all or a loose service level agreement (e.g., a "Gold Package" Internet service connection that guarantees a certain level of performance to a customer site).

3.) Site Type C: a site of type B (e.g., types B1, B2 or B3) but with more than one CE router (e.g., a first CE router connected to one link while a second CE router is connected to the other link), and potentially a backup link (e.g., a wireless 3G/4G/5G/LTE backup link). For example, a particular customer site may include a first CE router 110 connected to PE-2 and a second CE router 110 connected to PE-3.

Figure 1B:
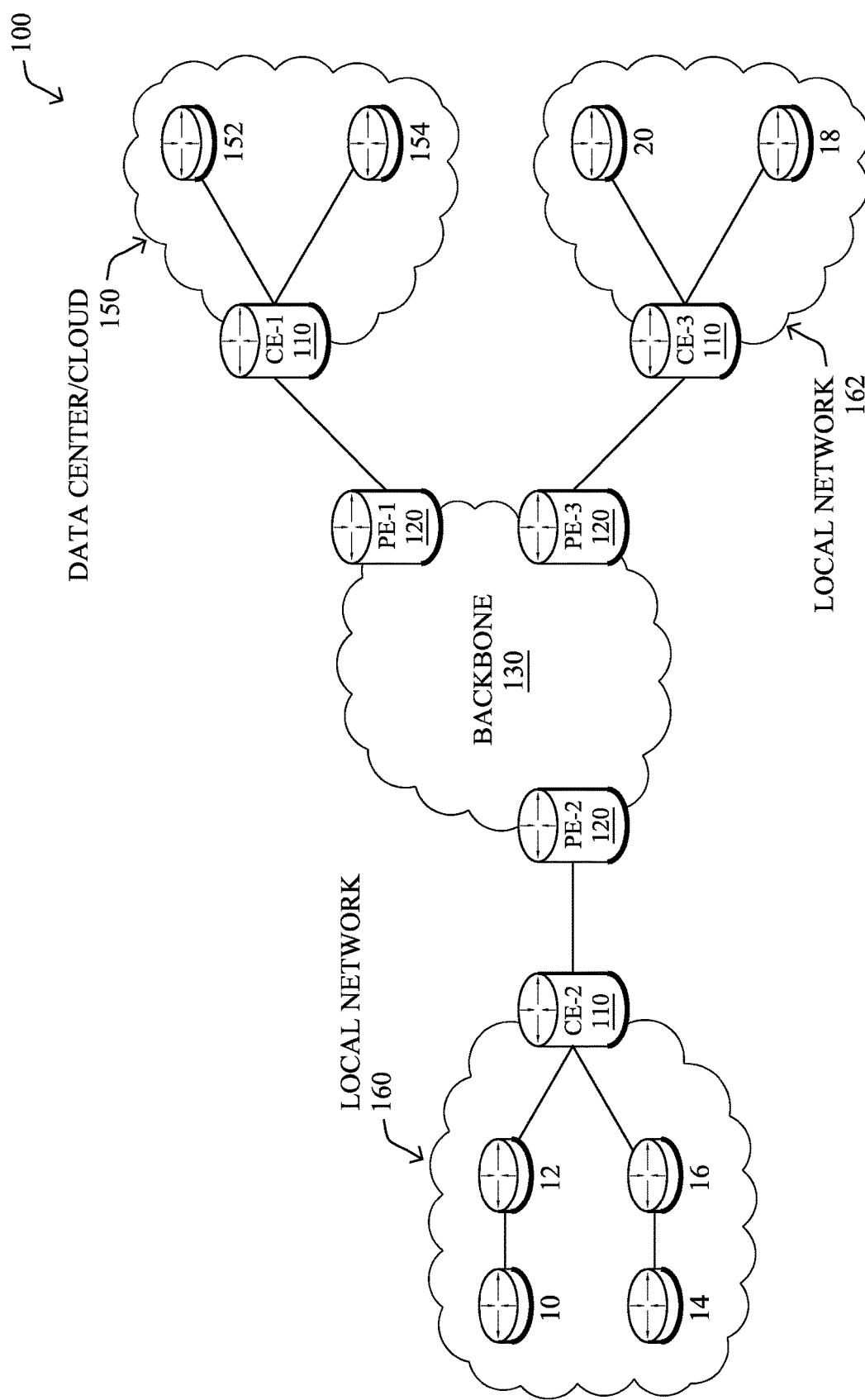

FIG. 1B illustrates an example of network 100 in greater detail, according to various embodiments. As shown, network backbone 130 may provide connectivity between devices located in different geographical areas and/or different types of local networks. For example, network 100 may comprise local/branch networks 160, 162 that include devices/nodes 10-16 and devices/nodes 18-20, respectively, as well as a data center/cloud environment 150 that includes servers 152-154. Notably, local networks 160-162 and data center/cloud environment 150 may be located in different geographic locations.

Servers 152-154 may include, in various embodiments, a network management server (NMS), a dynamic host configuration protocol (DHCP) server, a constrained application protocol (CoAP) server, an outage management system (OMS), an application policy infrastructure controller (APIC), an application server, etc. As would be appreciated, network 100 may include any number of local networks, data centers, cloud environments, devices/nodes, servers, etc.

In some embodiments, the techniques herein may be applied to other network topologies and configurations. For example, the techniques herein may be applied to peering points with high-speed links, data centers, etc.

According to various embodiments, a software-defined WAN (SD-WAN) may be used in network 100 to connect local network 160, local network 162, and data center/cloud environment 150. In general, an SD-WAN uses a software defined networking (SDN)-based approach to instantiate tunnels on top of the physical network and control routing decisions, accordingly. For example, as noted above, one tunnel may connect router CE-2 at the edge of local network 160 to router CE-1 at the edge of data center/cloud environment 150 over an MPLS or Internet-based service provider network in backbone 130. Similarly, a second tunnel may also connect these routers over a 4G/5G/LTE cellular service provider network. SD-WAN techniques allow the WAN functions to be virtualized, essentially forming a virtual connection between local network 160 and data center/cloud environment 150 on top of the various underlying connections. Another feature of SD-WAN is centralized management by a supervisory service that can monitor and adjust the various connections, as needed.

Figure 2:
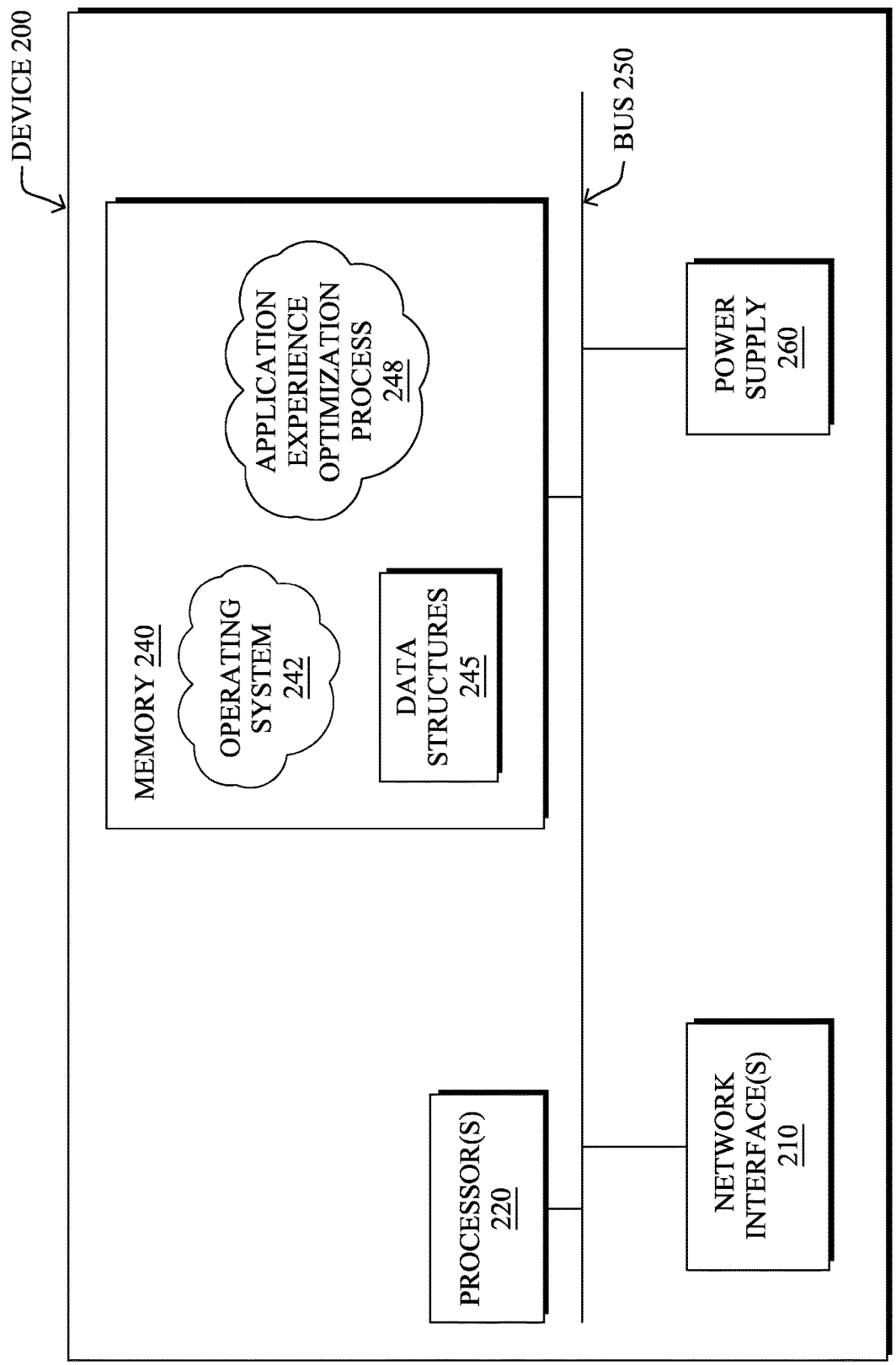
FIG. 2 illustrates an example network device/node.

FIG. 2 is a schematic block diagram of an example node/device 200 (e.g., an apparatus) that may be used with one or more embodiments described herein, e.g., as any of the computing devices shown in FIGS. 1A-1B, particularly the PE routers 120, CE routers 110, nodes/device 10-20, servers 152-154 (e.g., a network controller/supervisory service located in a data center, etc.), any other computing device that supports the operations of network 100 (e.g., switches, etc.), or any of the other devices referenced below. The device 200 may also be any other suitable type of device depending upon the type of network architecture in place, such as IoT nodes, etc. Device 200 comprises one or more network interfaces 210, one or more processors 220, and a memory 240 interconnected by a system bus 250, and is powered by a power supply 260.

The network interfaces 210 include the mechanical, electrical, and signaling circuitry for communicating data over physical links coupled to the network 100. The network interfaces may be configured to transmit and/or receive data using a variety of different communication protocols. Notably, a physical network interface 210 may also be used to implement one or more virtual network interfaces, such as for virtual private network (VPN) access, known to those skilled in the art.

The memory 240 comprises a plurality of storage locations that are addressable by the processor(s) 220 and the network interfaces 210 for storing software programs and data structures associated with the embodiments described herein. The processor 220 may comprise necessary elements or logic adapted to execute the software programs and manipulate the data structures 245. An operating system 242 (e.g., the Internetworking Operating System, or IOS®, of Cisco Systems, Inc., another operating system, etc.), portions of which are typically resident in memory 240 and executed by the processor(s), functionally organizes the node by, inter alia, invoking network operations in support of software processors and/or services executing on the device. These software processors and/or services may comprise an application experience optimization process 248, as described herein, any of which may alternatively be located within individual network interfaces.

It will be apparent to those skilled in the art that other processor and memory types, including various computer-readable media, may be used to store and execute program instructions pertaining to the techniques described herein. Also, while the description illustrates various processes, it is expressly contemplated that various processes may be embodied as modules configured to operate in accordance with the techniques herein (e.g., according to the functionality of a similar process). Further, while processes may be shown and/or described separately, those skilled in the art will appreciate that processes may be routines or modules within other processes.

In general, application experience optimization process 248 contains computer executable instructions executed by the processor 220 to perform routing functions in conjunction with one or more routing protocols. These functions may, on capable devices, be configured to manage a routing/forwarding table (a data structure 245) containing, e.g., data used to make routing/forwarding decisions. In various cases, connectivity may be discovered and known, prior to computing routes to any destination in the network, e.g., link state routing such as Open Shortest Path First (OSPF), or Intermediate-System-to-Intermediate-System (ISIS), or Optimized Link State Routing (OLSR). For instance, paths may be computed using a shortest path first (SPF) or constrained shortest path first (CSPF) approach. Conversely, neighbors may first be discovered (e.g., a priori knowledge of network topology is not known) and, in response to a needed route to a destination, send a route request into the network to determine which neighboring node may be used to reach the desired destination. Example protocols that take this approach include Ad-hoc On-demand Distance Vector (AODV), Dynamic Source Routing (DSR), DYnamic MANET On-demand Routing (DYMO), etc. Notably, on devices not capable or configured to store routing entries, application experience optimization process 248 may consist solely of providing mechanisms necessary for source routing techniques. That is, for source routing, other devices in the network can tell the less capable devices exactly where to send the packets, and the less capable devices simply forward the packets as directed.

In various embodiments, as detailed further below, application experience optimization process 248 may include computer executable instructions that, when executed by processor(s) 220, cause device 200 to perform the techniques described herein. To do so, in some embodiments, application experience optimization process 248 may utilize machine learning. In general, machine learning is concerned with the design and the development of techniques that take as input empirical data (such as network statistics and performance indicators), and recognize complex patterns in these data. One very common pattern among machine learning techniques is the use of an underlying model M, whose parameters are optimized for minimizing the cost function associated to M, given the input data. For instance, in the context of classification, the model M may be a straight line that separates the data into two classes (e.g., labels) such that $M=a*x+b*y+c$ and the cost function would be the number of misclassified points. The learning process then operates by adjusting the parameters a,b,c such that the number of misclassified points is minimal. After this optimization phase (or learning phase), the model M can be used very easily to classify new data points. Often, M is a statistical model, and the cost function is inversely proportional to the likelihood of M, given the input data.

In various embodiments, application experience optimization process 248 may employ one or more supervised, unsupervised, or semi-supervised machine learning models. Generally, supervised learning entails the use of a training set of data, as noted above, that is used to train the model to apply labels to the input data. For example, the training data may include sample telemetry that has been labeled as being indicative of an acceptable performance or unacceptable performance. On the other end of the spectrum are unsupervised techniques that do not require a training set of labels. Notably, while a supervised learning model may look for previously seen patterns that have been labeled as such, an unsupervised model may instead look to whether there are sudden changes or patterns in the behavior of the metrics. Semi-supervised learning models take a middle ground approach that uses a greatly reduced set of labeled training data.

Example machine learning techniques that application experience optimization process 248 can employ may include, but are not limited to, nearest neighbor (NN) techniques (e.g., k-NN models, replicator NN models, etc.), statistical techniques (e.g., Bayesian networks, etc.), clustering techniques (e.g., k-means, mean-shift, etc.), neural networks (e.g., reservoir networks, artificial neural networks, etc.), support vector machines (SVMs), generative adversarial networks (GANs), long short-term memory (LSTM), logistic or other regression, Markov models or chains, principal component analysis (PCA) (e.g., for linear models), singular value decomposition (SVD), multi-layer perceptron (MLP) artificial neural networks (ANNs) (e.g., for non-linear models), replicating reservoir networks (e.g., for non-linear models, typically for timeseries), random forest classification, or the like.

The performance of a machine learning model can be evaluated in a number of ways based on the number of true positives, false positives, true negatives, and/or false negatives of the model. For example, consider the case of a model that predicts whether the QoS of a path will satisfy the service level agreement (SLA) of the traffic on that path. In such a case, the false positives of the model may refer to the number of times the model incorrectly predicted that the QoS of a particular network path will not satisfy the SLA of the traffic on that path. Conversely, the false negatives of the model may refer to the number of times the model incorrectly predicted that the QoS of the path would be acceptable. True negatives and positives may refer to the number of times the model correctly predicted acceptable path performance or an SLA violation, respectively. Related to these measurements are the concepts of recall and precision. Generally, recall refers to the ratio of true positives to the sum of true positives and false negatives, which quantifies the sensitivity of the model. Similarly, precision refers to the ratio of true positives the sum of true and false positives.

As noted above, in software defined WANs (SD-WANs), traffic between individual sites are sent over tunnels. The tunnels are configured to use different switching fabrics, such as MPLS, Internet, 4G or 5G, etc. Often, the different switching fabrics provide different QoS at varied costs. For example, an MPLS fabric typically provides high QoS when compared to the Internet, but is also more expensive than traditional Internet. Some applications requiring high QoS (e.g., video conferencing, voice calls, etc.) are traditionally sent over the more costly fabrics (e.g., MPLS), while applications not needing strong guarantees are sent over cheaper fabrics, such as the Internet.

Traditionally, network policies map individual applications to Service Level Agreements (SLAs), which define the satisfactory performance metric(s) for an application, such as loss, latency, or jitter. Similarly, a tunnel is also mapped to the type of SLA that is satisfies, based on the switching fabric that it uses. During runtime, the SD-WAN edge router then maps the application traffic to an appropriate tunnel. Currently, the mapping of SLAs between applications and tunnels is performed manually by an expert, based on their experiences and/or reports on the prior performances of the applications and tunnels.

The emergence of infrastructure as a service (IaaS) and software-as-a-service (SaaS) is having a dramatic impact of the overall Internet due to the extreme virtualization of services and shift of traffic load in many large enterprises. Consequently, a branch office or a campus can trigger massive loads on the network.

Figure 3A:
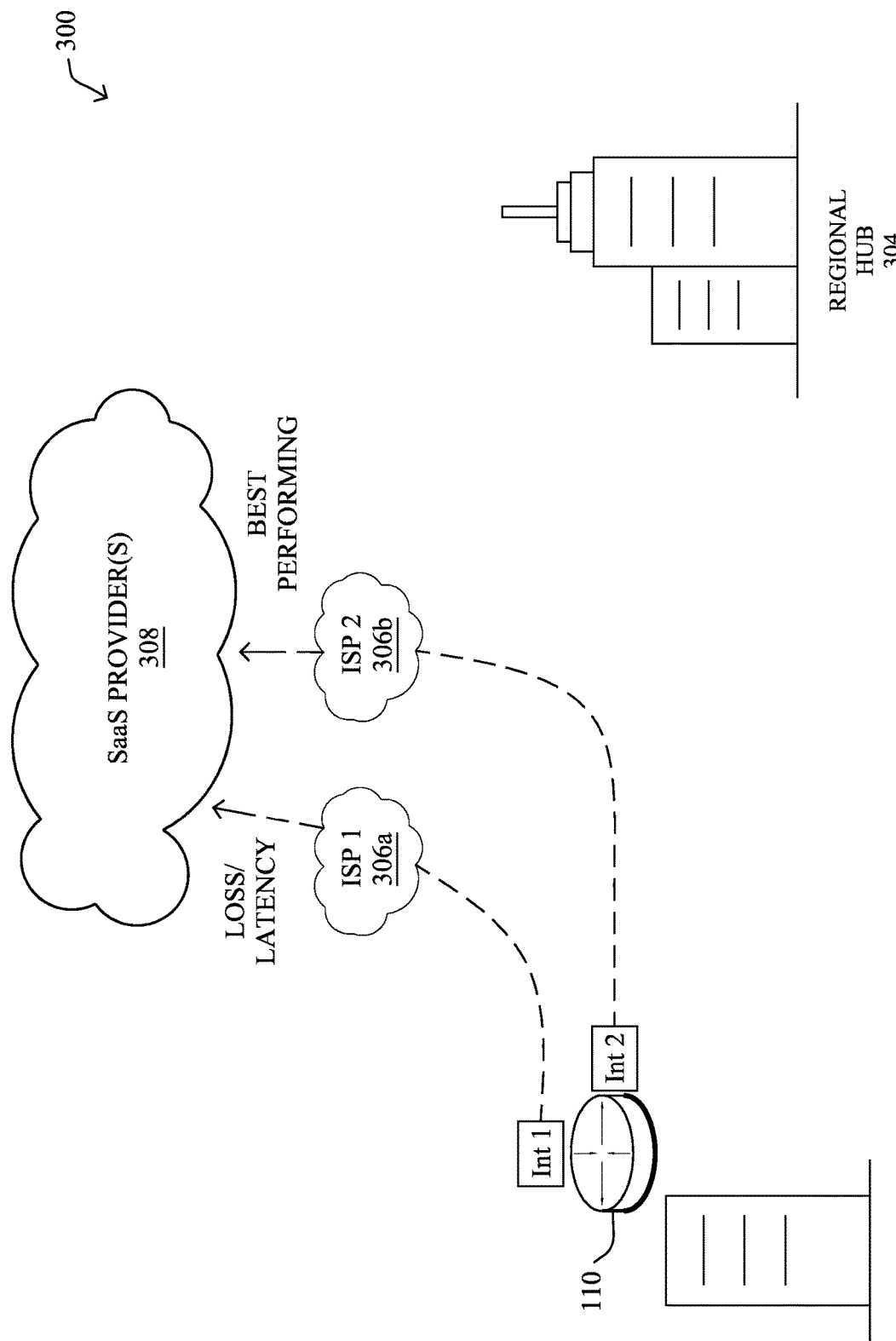
FIGS. 3A-3B illustrate example network deployments.
Figure 3B:
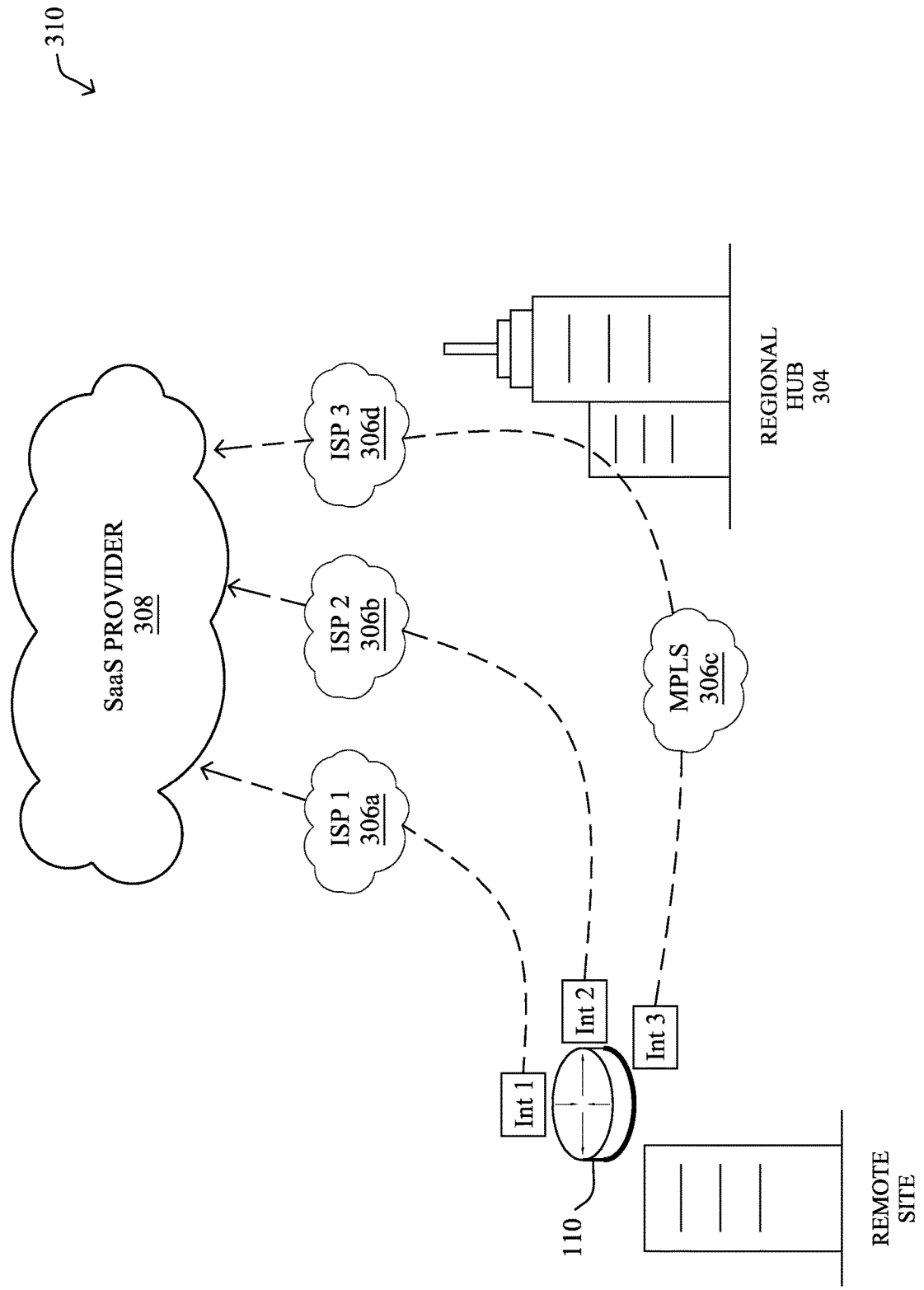

FIGS. 3A-3B illustrate example network deployments 300, 310, respectively. As shown, a router 110 located at the edge of a remote site 302 may provide connectivity between a local area network (LAN) of the remote site 302 and one or more cloud-based, SaaS providers 308. For example, in the case of an SD-WAN, router 110 may provide connectivity to SaaS provider(s) 308 via tunnels across any number of networks 306. This allows clients located in the LAN of remote site 302 to access cloud applications (e.g., Office 365™, Dropbox™, etc.) served by SaaS provider(s) 308.

As would be appreciated, SD-WANs allow for the use of a variety of different pathways between an edge device and an SaaS provider. For example, as shown in example network deployment 300 in FIG. 3A, router 110 may utilize two Direct Internet Access (DIA) connections to connect with SaaS provider(s) 308. More specifically, a first interface of router 110 (e.g., a network interface 210, described previously), Int 1, may establish a first communication path (e.g., a tunnel) with SaaS provider(s) 308 via a first Internet Service Provider (ISP) 306a, denoted ISP 1 in FIG. 3A. Likewise, a second interface of router 110, Int 2, may establish a backhaul path with SaaS provider(s) 308 via a second ISP 306b, denoted ISP 2 in FIG. 3A.

FIG. 3B illustrates another example network deployment 310 in which Int 1 of router 110 at the edge of remote site 302 establishes a first path to SaaS provider(s) 308 via ISP 1 and Int 2 establishes a second path to SaaS provider(s) 308 via a second ISP 306b. In contrast to the example in FIG. 3A, Int 3 of router 110 may establish a third path to SaaS provider(s) 308 via a private corporate network 306c (e.g., an MPLS network) to a private data center or regional hub 304 which, in turn, provides connectivity to SaaS provider (s) 308 via another network, such as a third ISP 306d.

Regardless of the specific connectivity configuration for the network, a variety of access technologies may be used (e.g., ADSL, 4G, 5G, etc.) in all cases, as well as various networking technologies (e.g., public Internet, MPLS (with or without strict SLA), etc.) to connect the LAN of remote site 302 to SaaS provider(s) 308. Other deployments scenarios are also possible, such as using Colo, accessing SaaS provider(s) 308 via Zscaler or Umbrella services, and the like.

Figure 4A:
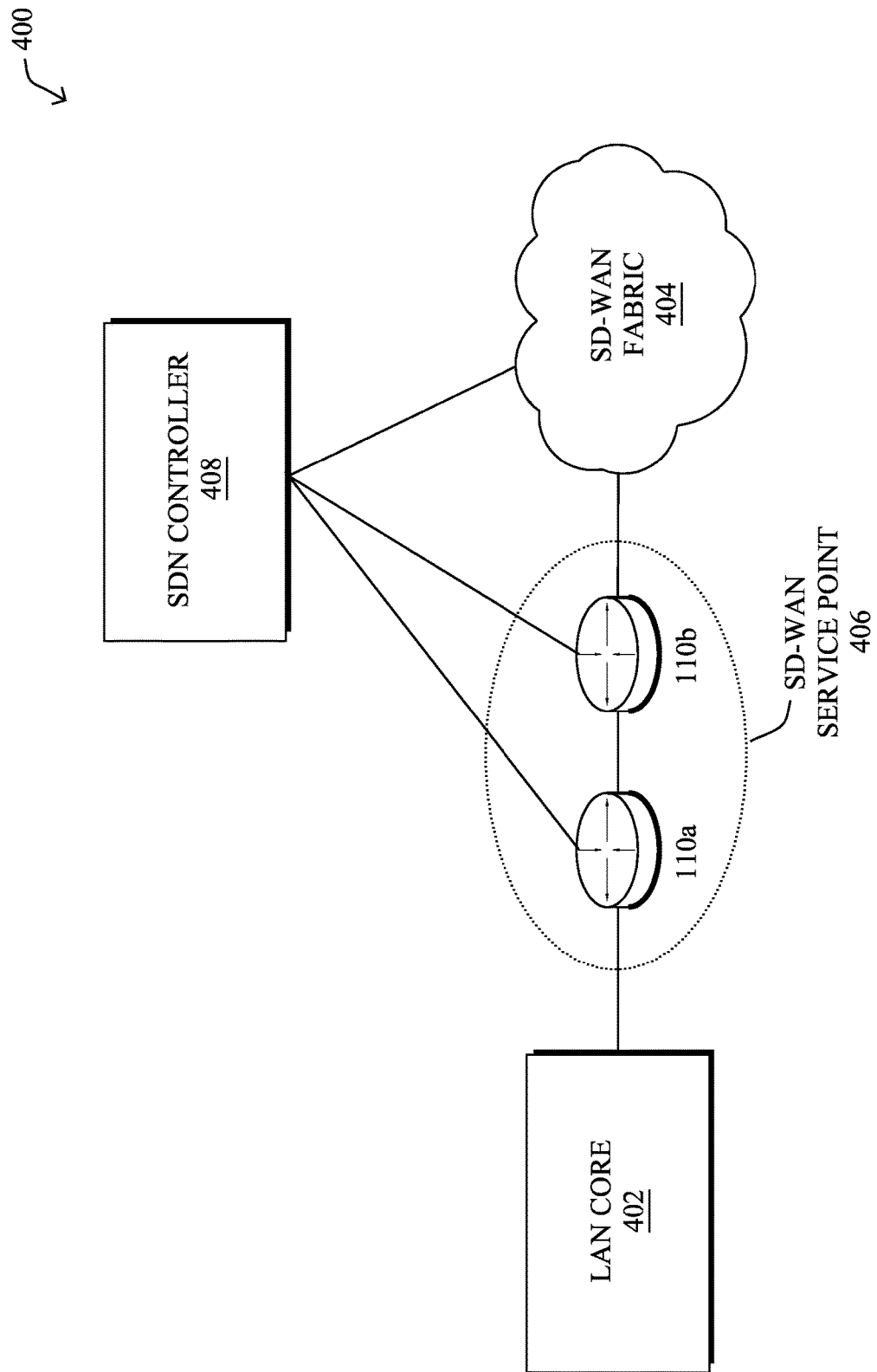
FIGS. 4A-4B illustrate example software defined network (SDN) implementations.

FIG. 4A illustrates an example SDN implementation 400, according to various embodiments. As shown, there may be a LAN core 402 at a particular location, such as remote site 302 shown previously in FIGS. 3A-3B. Connected to LAN core 402 may be one or more routers that form an SD-WAN service point 406 which provides connectivity between LAN core 402 and SD-WAN fabric 404. For instance, SD-WAN service point 406 may comprise routers 110a-110b.

Overseeing the operations of routers 110a-110b in SD-WAN service point 406 and SD-WAN fabric 404 may be an SDN controller 408. In general, SDN controller 408 may comprise one or more devices (e.g., a device 200) configured to provide a supervisory service, typically hosted in the cloud, to SD-WAN service point 406 and SD-WAN fabric 404. For instance, SDN controller 408 may be responsible for monitoring the operations thereof, promulgating policies (e.g., security policies, etc.), installing or adjusting IPsec routes/tunnels between LAN core 402 and remote destinations such as regional hub 304 and/or SaaS provider(s) 308 in FIGS. 3A-3B, and the like.

As noted above, a primary networking goal may be to design and optimize the network to satisfy the requirements of the applications that it supports. So far, though, the two worlds of "applications" and "networking" have been fairly siloed. More specifically, the network is usually designed in order to provide the best SLA in terms of performance and reliability, often supporting a variety of Class of Service (CoS), but unfortunately without a deep understanding of the actual application requirements. On the application side, the networking requirements are often poorly understood even for very common applications such as voice and video for which a variety of metrics have been developed over the past two decades, with the hope of accurately representing the Quality of Experience (QoE) from the standpoint of the users of the application.

More and more applications are moving to the cloud and many do so by leveraging an SaaS model. Consequently, the number of applications that became network-centric has grown approximately exponentially with the raise of SaaS applications, such as Office 365, ServiceNow, SAP, voice, and video, to mention a few. All of these applications rely heavily on private networks and the Internet, bringing their own level of dynamicity with adaptive and fast changing workloads. On the network side, SD-WAN provides a high degree of flexibility allowing for efficient configuration management using SDN controllers with the ability to benefit from a plethora of transport access (e.g., MPLS, Internet with supporting multiple CoS, LTE, satellite links, etc.), multiple classes of service and policies to reach private and public networks via multi-cloud SaaS.

Furthermore, the level of dynamicity observed in today's network has never been so high. Millions of paths across thousands of Service Provides (SPs) and a number of SaaS applications have shown that the overall QoS(s) of the network in terms of delay, packet loss, jitter, etc. drastically vary with the region, SP, access type, as well as over time with high granularity. The immediate consequence is that the environment is highly dynamic due to:

New in-house applications being deployed;

New SaaS applications being deployed everywhere in the network, hosted by a number of different cloud providers;

Internet, MPLS, LTE transports providing highly varying performance characteristics, across time and regions;

SaaS applications themselves being highly dynamic: it is common to see new servers deployed in the network. DNS resolution allows the network for being informed of a new server deployed in the network leading to a new destination and a potentially shift of traffic towards a new destination without being even noticed.

According to various embodiments, application aware routing usually refers to the ability to rout traffic so as to satisfy the requirements of the application, as opposed to exclusively relying on the (constrained) shortest path to reach a destination IP address. Various attempts have been made to extend the notion of routing, CSPF, link state routing protocols (ISIS, OSPF, etc.) using various metrics (e.g., Multi-topology Routing) where each metric would reflect a different path attribute (e.g., delay, loss, latency, etc.), but each time with a static metric. At best, current approaches rely on SLA templates specifying the application requirements so as for a given path (e.g., a tunnel) to be "eligible" to carry traffic for the application. In turn, application SLAs are checked using regular probing. Other solutions compute a metric reflecting a particular network characteristic (e.g., delay, throughput, etc.) and then selecting the supposed 'best path,' according to the metric.

The term 'SLA failure' refers to a situation in which the SLA for a given application, often expressed as a function of delay, loss, or jitter, is not satisfied by the current network path for the traffic of a given application. This leads to poor QoE from the standpoint of the users of the application. Modern SaaS solutions like Viptela, CloudonRamp SaaS, and the like, allow for the computation of per application QoE by sending HyperText Transfer Protocol (IMP) probes along various paths from a branch office and then route the application's traffic along a path having the best QoE for the application. At a first sight, such an approach may solve many problems. Unfortunately, though, there are several shortcomings to this approach:

The SLA for the application is 'guessed,' using static thresholds.

Routing is still entirely reactive: decisions are made using probes that reflect the status of a path at a given time, in contrast with the notion of an informed decision.

SLA failures are very common in the Internet and a good proportion of them could be avoided (e.g., using an alternate path), if predicted in advance.

Figure 4B:
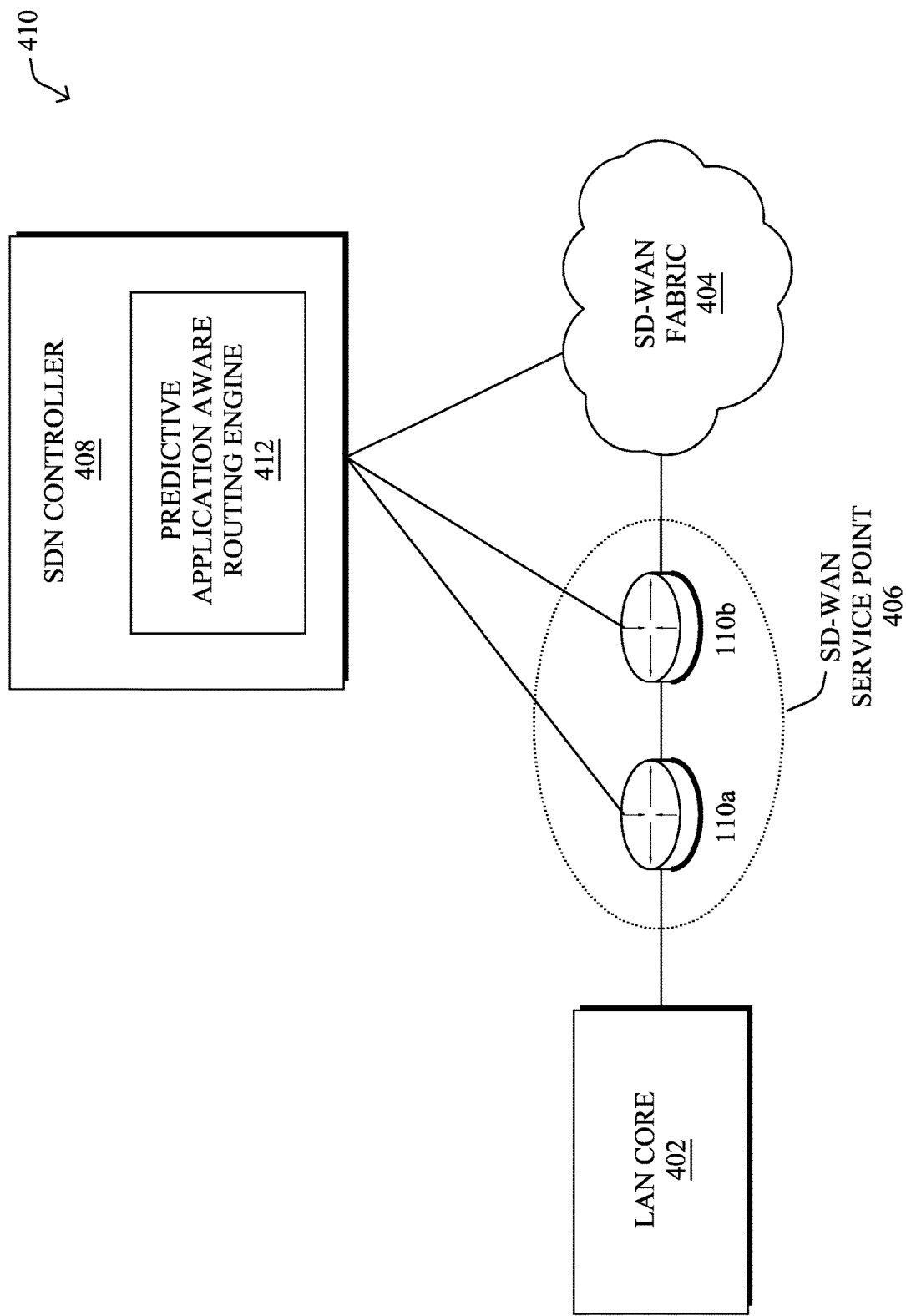

In various embodiments, the techniques herein allow for a predictive application aware routing engine to be deployed, such as in the cloud, to control routing decisions in a network. For instance, the predictive application aware routing engine may be implemented as part of an SDN controller (e.g., SDN controller 408) or other supervisory service, or may operate in conjunction therewith. For instance, FIG. 4B illustrates an example 410 in which SDN controller 408 includes a predictive application aware routing engine 412 (e.g., through execution of application experience optimization process 248). Further embodiments provide for predictive application aware routing engine 412 to be hosted on a router 110 or at any other location in the network.

During execution, predictive application aware routing engine 412 makes use of a high volume of network and application telemetry (e.g., from routers 110a-110b, SD-WAN fabric 404, etc.) so as to compute statistical and/or machine learning models to control the network with the objective of optimizing the application experience and reducing potential down times. To that end, predictive application aware routing engine 412 may compute a variety of models to understand application requirements, and predictably route traffic over private networks and/or the Internet, thus optimizing the application experience while drastically reducing SLA failures and downtimes.

In other words, predictive application aware routing engine 412 may first predict SLA violations in the network that could affect the QoE of an application (e.g., due to spikes of packet loss or delay, sudden decreases in bandwidth, etc.). In other words, predictive application aware routing engine 412 may use SLA violations as a proxy for actual QoE information (e.g., ratings by users of an online application regarding their perception of the application), unless such QoE information is available from the provider of the online application. In turn, predictive application aware routing engine 412 may then implement a corrective measure, such as rerouting the traffic of the application, prior to the predicted SLA violation. For instance, in the case of video applications, it now becomes possible to maximize throughput at any given time, which is of utmost importance to maximize the QoE of the video application. Optimized throughput can then he used as a service triggering the routing decision for specific application requiring highest throughput, in one embodiment. In general, routing configuration changes are also referred to herein as routing "patches," which are typically temporary in nature (e.g., active for a specified period of time) and may also be application-specific (e.g., for traffic of one or more specified applications).

Figure 5:
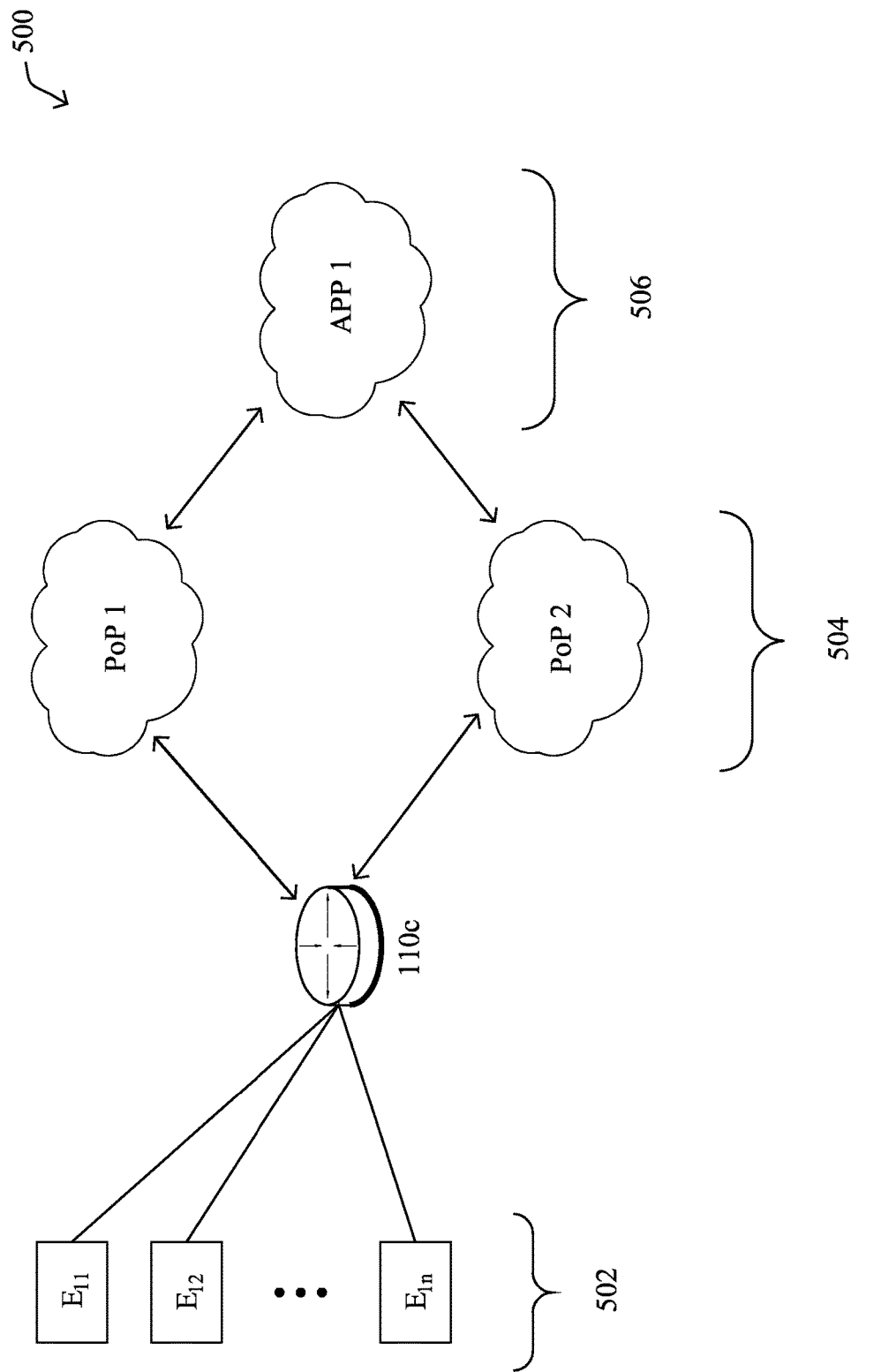
FIG. 5 illustrates an example of an edge router connecting to a cloud-hosted application via multiple points of presence (PoPs)

FIG. 5 illustrates an example 500 of an edge router 110c accessing a cloud-hosted application 506. As shown, assume that there are n-number of endpoints 502 at a particular location for which edge router 110c provides external connectivity. Under a SASE model, a SASE provider may maintain any number of PoPs 504 to which edge router 110c: may connect. Accordingly, edge router 110c may access a cloud-hosted application 506, such as an SaaS application, via a first PoP among PoPs 504, a second PoP among PoPs 504, etc.

As noted above, even though public cloud providers might have a high number of PoPs and use them to deliver an online application, the QoE for that application may vary greatly based on the user and application location. This is because all public cloud providers are delivering services that are region based and at the end applications are running in specific region and location (or multiple specific regions and locations). Testing has shown that the SaaS application response and the QoE offered by the application vary depending on multiple factors such as the endpoint itself, the geo-region in which it is located, the PoP to which it connects, the time-of-the-day, and the like.

Moreover, SaaS applications are typically dynamic, migrating between different public and private clouds (Multicloud) over time. For instance, as shown in FIG. 5, the set of PoPs 504, as well as the location of cloud-hosted application 506, may change over time due to factor such as cost, performance, serviceability, etc.

Today, routing engines do not take the migration of online applications into account when making routing decisions. Instead, it is usually left to the application provider to influence the client and direct the application traffic towards the 'best' PoP, Such an approach usually relies on Domain Name System (DNS) protocol information, so as to direct the application traffic to the PoP that is 'closest' to the endpoint client, either geographically or with the lowest latency. However, there are multiple pitfalls with such an approach, including:

A lack of visibility, as application providers do not have visibility into customer networks nor the Internet and are not able to see "all paths" from a client to different SaaS applications. Furthermore, the client is not capable of tracking where the application is located, leading to difficulty when troubleshooting.

When predictive routing engines are in used, such as predictive application aware routing engine 412, the detection of an application location changes must be taken into account since it could potentially have a dramatic impact on all predictions, in contrast with a reactive system that simply react to instantaneous measurements.

—Identifying Application QoE Changes Due to Application Location Migration—

The techniques herein introduce mechanisms to track the location of online/SaaS applications in a network, as well as any QoE changes that result from the migration from one location to another. In some aspects, when a correlation between a location change and QoE degradation is found, the techniques herein can further adjust routing of the application traffic, such as to a 'better' PoP, In further aspects, the techniques herein could also be used to trigger adjustments to a predictive routing mechanism used to make routing decisions for the application traffic, in response to identifying such a correlation, The aim of the proposed invention is to specify a novel mechanism used to perform SaaS application location tracking and detection of application relocation along with QOE changes caused by location changes. Such information is used to report to the user and may also be consumed by a predictive engine to trigger new prediction.

Illustratively, the techniques described herein may be performed by hardware, software, and/or firmware, such as in accordance with application experience optimization process 248, which may include computer executable instructions executed by the processor 220 (or independent processor of interfaces 210) to perform functions relating to the techniques described herein.

Specifically, according to various embodiments, a device generates an application map for an online application accessed via a network that indicates a set of network addresses at which the online application was accessed, client information for clients that accessed the online application via the network, and quality of experience metrics for the online application. The device identifies a location change of the online application by tracking changes to the application map. The device determines a correlation between the location change and a degradation in the quality of experience metrics. The device adjusts, based on the correlation, routing of traffic associated with the online application in the network.

Figure 6:
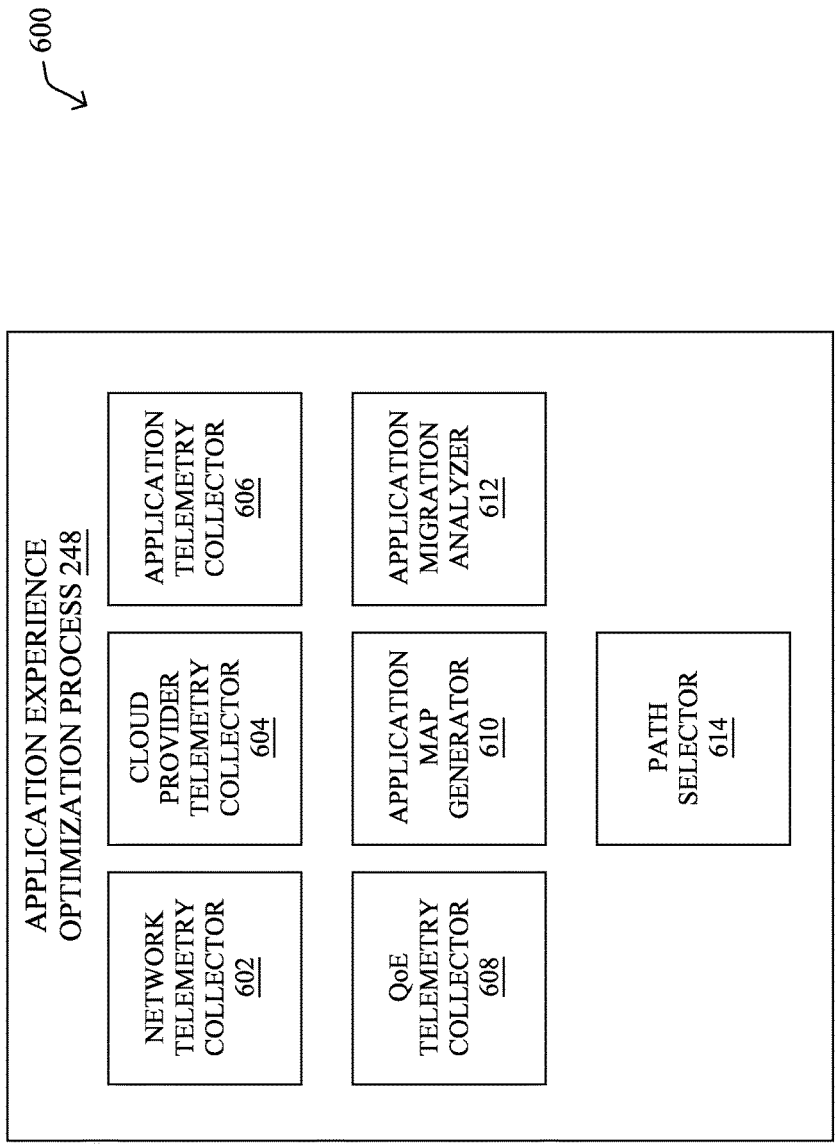
FIG. 6 illustrates an example architecture for identifying application quality of experience (QoE) changes due to application location migration.

Operationally, FIG. 6 illustrates an example architecture 600 for identifying application quality of experience (QoE) changes due to application location migration, according to various embodiments. At the core of architecture 600 is application experience optimization process 248, which may be executed by a controller for a network or another device in communication therewith. For instance, application experience optimization process 248 may be executed by a controller for a network (e.g., SDN controller 408 in FIGS. 4A-4B), a particular networking device in the network (e.g., a router, etc.), a client in a network, another device or service in communication therewith, or the like. In further embodiments, architecture 600 may be implemented as part of a Secure Access Service Edge (SASE) deployment, which combines networking and security functions.

As shown, architecture 600 may include any or all of the following components: a network telemetry collector 602, a cloud provider telemetry collector 604, an application telemetry collector 606, a QoE telemetry collector 608, an application map generator 610, an application migration analyzer 612, and/or a path selector 614. As would be appreciated, the functionalities of these components may be combined or omitted, as desired. In addition, these components may be implemented on a singular device or in a distributed manner, in which case the combination of executing devices can be viewed as is their own singular device for purposes of executing application experience optimization process 248.

In various embodiments, network telemetry collector 602 may be responsible for obtaining information about any or all clients connecting to one or more online/SaaAS applications. Such information could be captured, for instance, by the various routers or other networking entities in the SD-WAN or other network. For example, network telemetry collector 602 may obtain NetFlow or IPFIX traffic flow records. Such information could also be stored in a datalake for further processing. In general, network telemetry collector 602 may identify tuples, based on the network telemetry, as follows: { client public IP, server public IP, application }.

In some embodiments, cloud provider telemetry collector 604 may likewise obtain telemetry data from any number of public cloud providers, such as Amazon Web Services (AWS), Microsoft Azure, Google Cloud Platform (GCP), or the like. In many cases, such providers supply detailed information regarding their services, such as a tuple of a form similar to the following: {public_IP, region, service}. For instance, the following information was obtained during testing regarding AWS:

{

"ip_prefix": "3.5.140.0/22",

"region": "ap-northeast-2",

"service": "S3",

"network_border_group": "ap-northeast-2"

}

In other words, AWS is using the public subnet 3.5.140.0/24 to deliver AWS S3 services in the ap-northeast-2 region (e.g., in the Asia Pacific region and based in Osaka).

In various embodiments, application telemetry collector 606 may be configured to obtain telemetry data from any number of application providers/vendors. In general, such information will at least indicate the public IP address(es) associated with a given application. This is complimentary to the telemetry data obtained by network telemetry is collector 602, but not all application providers expose such details. For instance, in the case of Exchange Online, Microsoft explicitly publishes its set of IP addresses such as 13.107.6.152/31, 13.107.18.10/31, 13.107.128.0/22, 23.103.160.0/20, etc.

Other examples of potential telemetry data sources for application telemetry collector 606 include utilities provided by SaaS application providers that allow access to the underlying services for purposes of performing application tracing. Examples of such utilities include AWS X-Ray, Cloudcraft.co, and the like.

In various embodiments, QoE telemetry collector 608 may be responsible for obtaining one or more QoE metrics for any given application traffic flow (e.g., client IP and/or public IP). In some instances, QoE telemetry collector 608 may obtain such metrics directly from the application itself, such as via an application programming interface (API) of the application. For instance, the QoE metrics may include a mean opinion score (MOS), a metric based on a user-specified satisfaction rating, or the like. In other instances, QoE telemetry collector 608 may obtain the QoE metrics from network-based sources, such as SD-WAN solutions like Cisco vManage Cloud on Ramp SaaS. Other sources could also include synthetic tests results from solutions like Cisco ThousandEyes.

Figure 7:
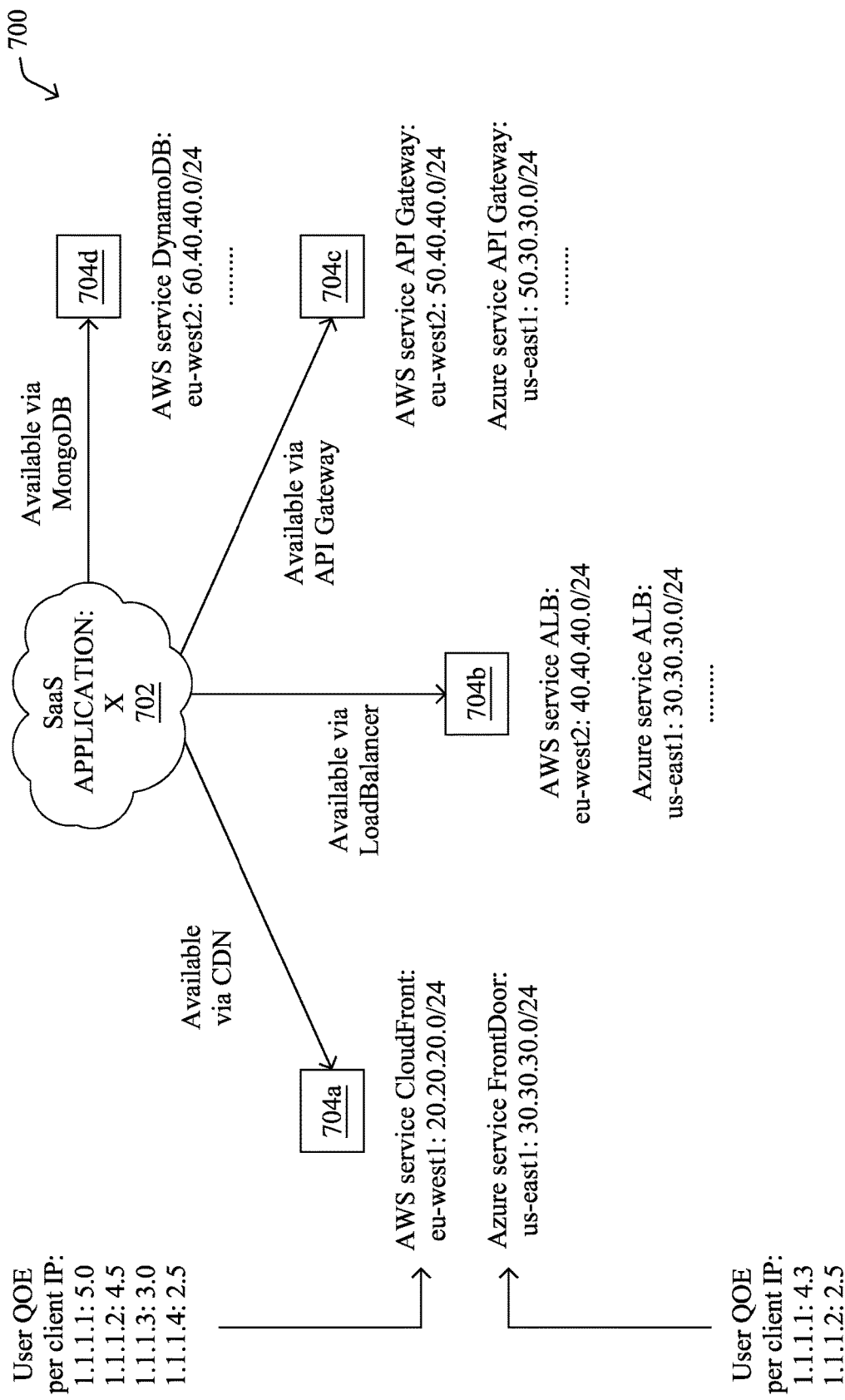
FIG. 7 illustrates an example application map for an online application.

In various embodiments, application map generator 610 may aggregate the telemetry data from any or all of collectors 602-608 to generate a dynamic application map for each online application under consideration. Such an application map may include a list of all public IP addresses (and subnets) which are being used to deliver that specific SaaS application. For each one, additional details could also be included such as any or all of the following:

Whether it is a public or private cloud
The identity of any public cloud vendor, region, exact service (e.g. AWS, Ireland, S3), etc.
The clients connecting to that public IP address, as well as their geographic locations and associated QoE metrics By way of example, FIG. 7 illustrates an example application map 700 for an online application, in various embodiments. As shown, application map 700 may indicate that an SaaS application 702 is deployed across multiple clouds using different native services. Such a map may be dynamic and updated over the time, to account for any migration to different clouds or the like. Doing so allows application experience optimization process 248 to discover not only where application 702 is running, but also the client connectivity patterns for SaaS application 702, and their associated QoE metrics. For instance, as shown, application 702 may be accessible via various locations 704a-704d, such as a content delivery network (CDN) 704a, a load balancer 704b, an API gateway 704c, MongoDB 704d, or the like. In turn, application map 700 may aggregate, for each of these, the telemetry data collected by telemetry data collectors 602-608 in FIG. 6.

Figure 8:
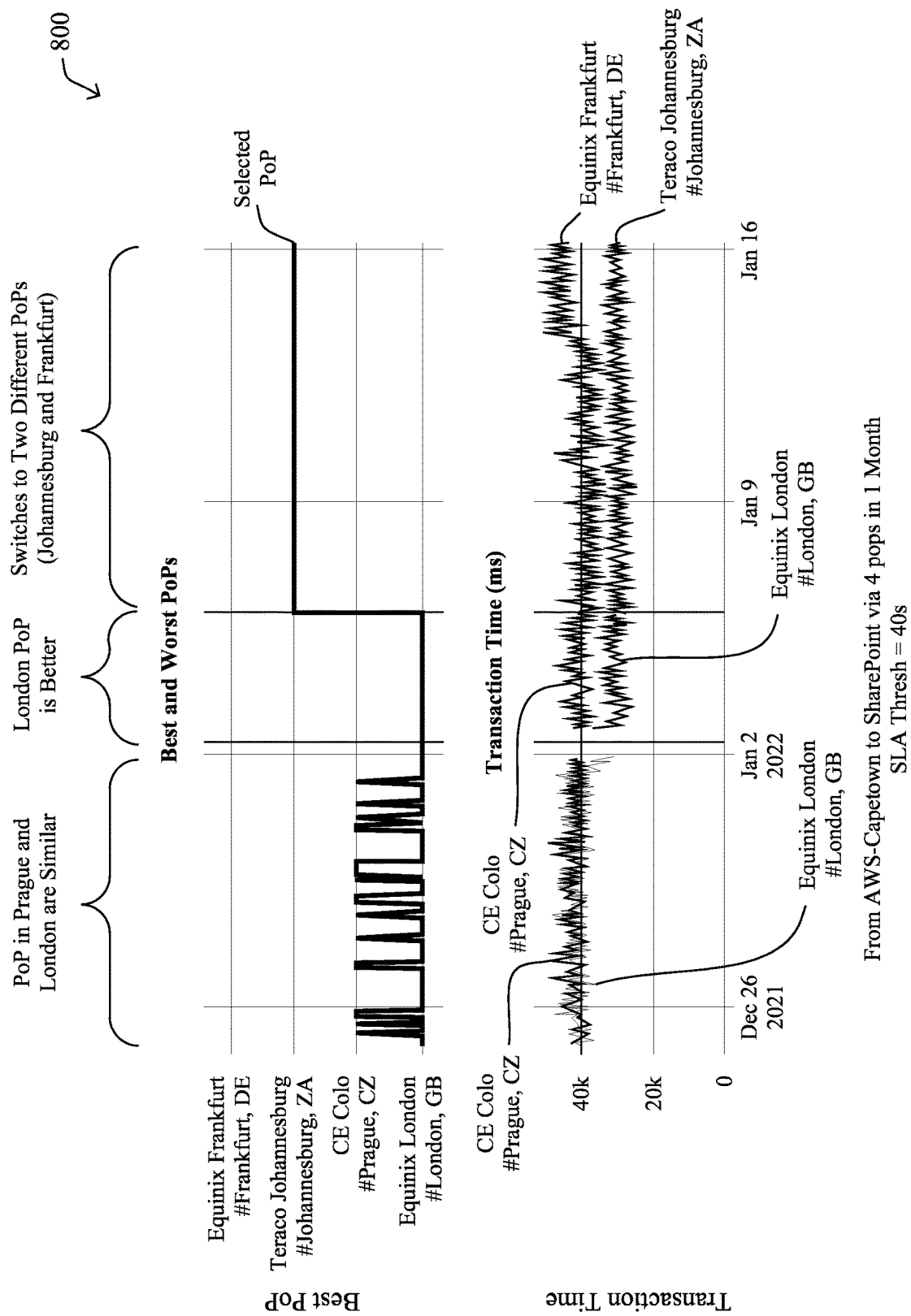
FIG. 8 illustrates an example plot showing the best PoP for an application changing over time.

As would be appreciated, capturing the application map dynamically over time can also reveal how the best PoP for a client can change over time. For instance, FIG. 8 illustrates an example plot 800 based on testing data for the SharePoint application. More specifically, a node in the region aws-capetown connects to four different SharePoint PoPs over the course of a month: a PoP located in Prague, a PoP located in London, a PoP located in Johannesburg, and a PoP located in Frankfurt. The transaction times associated with these connections are also shown.

From plot 800, it can be seen that for the first week, the PoPs in Prague and London offer similar performance with respect to the transaction time, with the 'best' PoP alternating between these two during this time. However, for the next few days, the PoP in London is clearly better than the PoP in Prague. Finally, the node connects to two different PoPs (Johannesburg and Frankfurt) and the PoP in Johannesburg is better than the other in terms of transaction times.

Referring again to FIG. 6, another potential function of application migration is analyzer 612 may be to notify a predictive routing system for the network as to any location changes for an online application. For instance, upon detecting a location changes for a given SaaS application from its application map, application migration analyzer 612 may send a custom message to the probing mechanism of the predictive routing system, so as to trigger a new series of probes and update the path metrics for the application that has moved. In addition, the predictive routing engine that relies on such path metrics to make predictions for the previous location may also be notified. In a further embodiment, the notification may also include addition information such as the expected impact (e.g., new location is significantly different from the existing one), the probability that the application will move again considering the past trajectory observed for the application, or the like.

After receiving the notification(s) from application migration analyzer 612 regarding the application location change, the predictive system may assess its existing predictions that may be impacted by the migration of the application to a different location. Indeed, a predictive may have a number of proactive rerouting driven by the previous location for the SaaS applications that would no longer be valid. As a result, the previous predictions may simply be cancelled or updated after a fast retraining of the predictive model.

In various embodiments, application migration analyzer 612 may be in charge of determining whether the application QoE is correlated with a change in the hosting location of the online application. For instance, consider the case in which there is a change in the connectivity pattern indicating a migration from a CDN to a datacenter associated with the application. In such a case, application migration analyzer 612 may assess whether there are any corresponding performance changes that could indicate degradation of the QoE (e.g., an increase in the packet loss, etc.).

In some embodiments, application migration analyzer 612 may provide information regarding the application map(s) to a user interface for display. For instance, application migration analyzer 612 could show to the user a geographic map that indicates where each application of interest is located in that region.

In addition to the actual locations of an SaaS application, application migration analyzer 612 could also provide any or all of the following information:

The number of different locations at which the SaaS application has been observed over the past x days, where x could be user configurable.
The measured QoE for each location at which the SaaS applications was hosted. Such a metric could be computed by retrieving the past QoE metrics for all user in the region and for each location of the application. Note that the QoE may be measured using static templates related to network KPIs (e.g., delay, loss, jitter) or reported by the application itself (e.g., using a MoS score, user ratings, etc.).
For each location, a metric may also be shown that indicates the degree of dynamicity (e.g., the average number of days that the application was located in a given location, etc.).

In one embodiment, application migration analyzer 612 may construct a path P as a path between the edge-router as the source and the SaaS application as the destination endpoint. The destination endpoint may then be represented with tuple <SaaS application, publicCloudVendor, region, service>. Note that the publicCloudVendor can be "null" for a private cloud, in this case. For each application flow that is detected (e.g., by network telemetry collector 602), application migration analyzer 612 may associate the number of sessions and the application QoE to the path P by mapping the data collected by QoE telemetry collector 608.

In turn, application migration analyzer 612 may generate a traffic and user QoE quantifier to estimate the efficacy of the path between a given edge-router E and all other SaaS application endpoints (e.g., given by other tuples <SaaS application, publicCloudVendor, region, service> for the same SaaS application) at various times t. In one embodiment, the mean number of sessions (or user QoE) for each path P between E and <SaaS application, publicCloudVendor, region, service> may bemeasured at each is time period, such as every hour. Application migration analyzer 612 may then quantify the changes in the number of sessions (or user QoE) by looking at the difference of mean user QoE differences over time t and t+1. If there is a large difference, then such paths may be marked as changing SaaS traffic.

In other embodiments, application migration analyzer 612 may compute and track the mean percentage of traffic routed from one edge router to any other SaaS endpoint of the same application. For example, if there are nine hundred flows to SaaS endpoint <salesforce, Akamai, US-west, salesforce> and one hundred flows to SaaS endpoint <salesforce, Akamai, US-east, salesforce>, then the percentage of flows to US-west is 90% and to that of US-east is 10%. The time-series of the percentage of flows instead of actual number of flows can be measured to mitigate the effect of time-of-the-day and day-of-the-week effects.

In further embodiments, application migration analyzer 612 may determine the difference in the number of sessions, percentage of sessions, and/or user QoE by computing the distribution of the metric for every path at every time period t. This variation of this distribution can be quantified by measuring the distance between the distribution at time t (say, denoted by D(P,t)), and distribution at time (t+1), D(P, t+1), usch as by computing a Kolmogorov-Smirnov statistic or Cramer-von Mises distance. The difference in the distribution distance can then be measured, to assess the change in metric across time. In addition, application migration analyzer 612 may also provide the change in distribution of user QoE and session information to a user interface for review.

In various embodiments, path selector 614 may be used to automate corrective measures in the network, so as to influence the SaaS application selection and obtain the best user QoE per application. To do so, path selector 614 may interface with various network functions, such as by using an SD-WAN connector to instantiate temporary data policies in the SD-WAN or a Secure Internet Gateway (SIG) connector to select the best SIG PoP.

In one instance, path selector 614 may consider all paths P1, P2, . . . , Pn between a given edge-router and different endpoints of the SaaS application. To do so, path selector 614 may construct a decision engine to find the best SaaS endpoint from the given router. In one embodiment, the distribution of user QoE is measured for all paths and a measure of spread of the distribution is computed using statistical measures such as standard-deviation or interquartile range of user QoE. The best endpoint is then decided by path selector 614 by choosing the endpoint which has the highest mean or median user QoE with narrow standard-deviation or interquartile range (IQR). In the case of an overlapping standard-deviation or IQR, the tie can be broken by the mean or standard deviation.

In another embodiment, path selector 614 may construct the distribution of user QoE for every path for every time-bin (e.g., every hour for every day-of-the-week). Then, for a given day and time, path selector 614 may compare he distributions from all paths from an appropriate time-bin.

In yet another embodiment, path selector 614 may leverage a timeseries forecasting algorithm to predict the user QoE bands for every path. In turn, path selector 614 may select the path with the best forecasted user QoE.

Regardless, path selector 614 may effect the path policy by sending it either directly or indirectly to the device(s) responsible for such decisions in the network. For instance, path selector 614 may send the path selection to an SD-WAN controller, to cause the application traffic from a certain client to be sent via the selected path.

Figure 9:
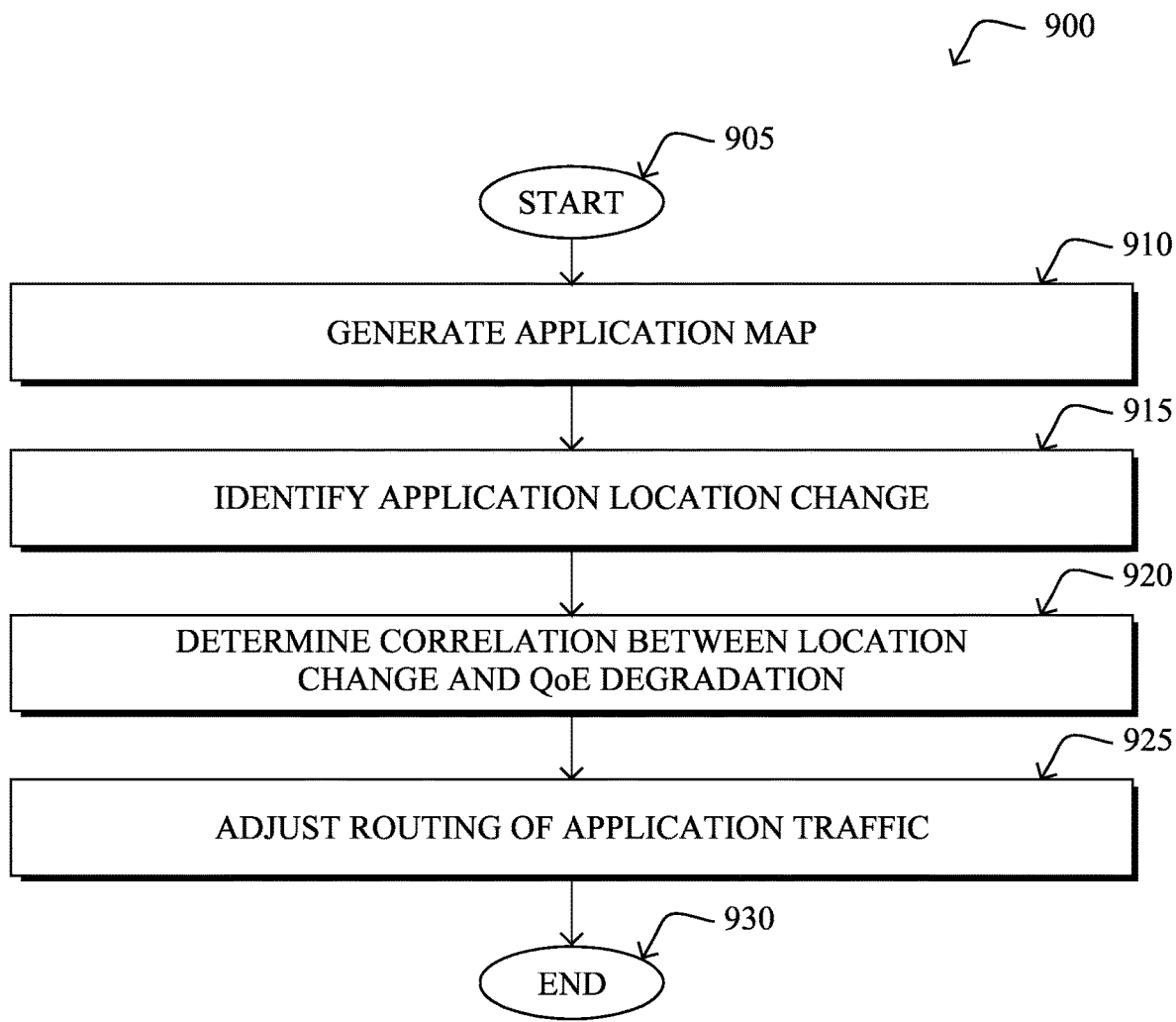
FIG. 9 illustrates an example simplified procedure for identifying application quality of experience (QoE) changes due to application location migration.

FIG. 9 illustrates an example simplified procedure 900 (i.e., a method) for identifying application quality of experience (QoE) changes due to application location migration, in accordance with one or more embodiments described herein. For example, a non-generic, specifically configured device (e.g., device 200), such as controller for a network (e.g., an SDN controller or other device in communication therewith,), a networking device, etc., may perform procedure 900 by executing stored instructions (e.g., application experience optimization process 248). The procedure 900 may start at is step 905, and continues to step 910, where, as described in greater detail above, the device generates an application map for an online application accessed via a network (e.g., an SDN, such as an SD-WAN). In general, the application map indicates a set of network addresses at which the online application was accessed, client information for clients that accessed the online application via the network, and quality of experience metrics for the online application. In other words, the map may be a set of logical associations between these different forms of telemetry data. In one embodiment, the application map further identifies a cloud provider that hosts the online application. In another embodiment, the application map further indicates one or more geographic regions in which the online application is hosted.

At step 915, as detailed above, the device may identify a location change of the online application by tracking changes to the application map. In various embodiments, the device may do so by identifying a change in the network addresses at which the application was accessed, identifying a change in the cloud provider of the application, or identifying a region change associated with the application.

At step 920, the device may determine a correlation between the location change and a degradation in the quality of experience metrics, as described in greater detail above.

At step 925, as detailed above, the device may adjust, based on the correlation, routing of traffic associated with the online application in the network. In some embodiments, the device may do so by causing the traffic associated with the online application from a particular router in the network to be sent to a different point of presence in the network. In further embodiments, the device may do so by indicating the location change of the online application to a predictive routing engine for the network. In response to the location change of the online application, the predictive routing engine may initiate probing of one or more paths in the network, cancel a prediction associated with the online application, and/or initiate retraining of a prediction model. the Procedure 900 then ends at step 930.

It should be noted that while certain steps within procedure 900 may be optional as described above, the steps shown in FIG. 9 are merely examples for illustration, and certain other steps may be included or excluded as desired. Further, while a particular order of the steps is shown, this ordering is merely illustrative, and any suitable arrangement of the steps may be utilized without departing from the scope of the embodiments herein.

While there have been shown and described illustrative embodiments that provide for identifying application quality of experience (QoE) changes due to application location migration, it is to be understood that various other adaptations and modifications may be made within the spirit and scope of the embodiments herein. For example, while certain embodiments are described herein with respect to using certain models for purposes of predicting application experience metrics, SLA violations, or other disruptions in a network, the models are not limited as such and may be used for other types of predictions, in other embodiments. In addition, while certain protocols are shown, other suitable protocols may be used, accordingly.

The foregoing description has been directed to specific embodiments. It will be apparent, however, that other variations and modifications may be made to the described embodiments, with the attainment of some or all of their advantages. For instance, it is expressly contemplated that the components and/or elements described herein can be implemented as software being stored on a tangible (non-transitory) computer-readable medium (e.g., disks/CDs/RAM/EEPROM/etc.) having program instructions executing on a computer, hardware, firmware, or a combination thereof. Accordingly, this description is to be taken only by way of example and not to otherwise limit the scope of the embodiments herein. Therefore, it is the object of the appended claims to cover all such variations and modifications as come within the true spirit and scope of the embodiments herein.

The invention claimed is:

1. A method comprising:
generating, by a device, an application map for an online application accessed via a network that indicates a set of network addresses at which the online application was accessed, client information for clients that accessed the online application via the network, and quality of experience metrics for the online application;
identifying, by the device, a location change of the online application by tracking changes to the application map;
determining, by the device, a correlation between the location change and a degradation in the quality of experience metrics; and
adjusting, by the device and based on the correlation, routing of traffic associated with the online application in the network.

2. The method as in claim 1, wherein adjusting routing of the traffic associated with the online application comprises:
causing the traffic associated with the online application from a particular router in the network to be sent to a different point of presence in the network.

3. The method as in claim 1, wherein the application map further identifies a cloud provider that hosts the online application.

4. The method as in claim 3, wherein identifying the location change of the online application by tracking changes to the application map comprises:
identifying a change in the cloud provider.

5. The method as in claim 1, wherein adjusting routing of traffic associated with the online application in the network comprises:
indicating the location change of the online application to a predictive routing engine for the network.

6. The method as in claim 5, wherein the predictive routing engine initiates probing of one or more paths in the network, in response to the location change of the online application.

7. The method as in claim 5, wherein the predictive routing engine cancels a prediction associated with the online application, in response to the location change of the online application.

8. The method as in claim 5, wherein the predictive routing engine initiates retraining of a prediction model, in response to the location change of the online application.

9. The method as in claim 1, wherein the application map further indicates one or more geographic regions in which the online application is hosted.

10. The method as in claim 1, wherein the network is a software defined network (SDN).

11. An apparatus, comprising:
one or more network interfaces;
a processor coupled to the one or more network interfaces and configured to execute one or more processes; and
a memory configured to store a process that is executable by the processor, the process when executed configured to:
generate an application map for an online application accessed via a network that indicates a set of network addresses at which the online application was accessed, client information for clients that accessed the online application via the network, and quality of experience metrics for the online application;
identify a location change of the online application by tracking changes to the application map;
determine a correlation between the location change and a degradation in the quality of experience metrics; and
adjust, based on the correlation, routing of traffic associated with the online application in the network.

12. The apparatus as in claim 11, wherein the apparatus adjusts routing of the traffic associated with the online application by:
causing the traffic associated with the online application from a particular router in the network to be sent to a different point of presence in the network.

13. The apparatus as in claim 11, wherein the application map further identifies a cloud provider that hosts the online application.

14. The apparatus as in claim 13, wherein the apparatus identifies the location change of the online application by tracking changes to the application map by:
identifying a change in the cloud provider.

15. The apparatus as in claim 11, wherein the apparatus adjusts routing of traffic associated with the online application in the network by:
indicating the location change of the online application to a predictive routing engine for the network.

16. The apparatus as in claim 15, wherein the predictive routing engine initiates probing of one or more paths in the network, in response to the location change of the online application.

17. The apparatus as in claim 15, wherein the predictive routing engine cancels a prediction associated with the online application, in response to the location change of the online application.

18. The apparatus as in claim 15, wherein the predictive routing engine initiates retraining of a prediction model, in response to the location change of the online application.

19. The apparatus as in claim 11, wherein the application map further indicates one or more geographic regions in which the online application is hosted.

20. A tangible, non-transitory, computer-readable medium storing program instructions that cause a device to execute a process comprising:
- generating, by the device, an application map for an online application accessed via a network that indicates a set of network addresses at which the online application was accessed, client information for clients that accessed the online application via the network, and quality of experience metrics for the online application;
- identifying, by the device, a location change of the online application by tracking changes to the application map;
- determining, by the device, a correlation between the location change and a degradation in the quality of experience metrics; and
- adjusting, by the device and based on the correlation, routing of traffic associated with the online application in the network.

* * * * *

UNITED STATES PATENT AND TRADEMARK OFFICE
CERTIFICATE OF CORRECTION

PATENT NO.        : 11,909,631 B1
APPLICATION NO.   : 17/877482
DATED             : February 20, 2024
INVENTOR(S)       : Michal Wladyslaw Garcarz et al.

Page 1 of 1

It is certified that error appears in the above-identified patent and that said Letters Patent is hereby corrected as shown below:

In the Specification

Column 10, Line 26 please amend as shown:
throughput can then be used as a service triggering the Column 12, Line 17 please amend as shown:
viewed as their own singular device for purposes of Column 12, Line 59 please amend as shown:
to the telemetry data obtained by network telemetry Column 15, Line 11 please amend as shown:
dor, region, service> may be measured at each time period, Column 16, Line 24 please amend as shown:
may start at step 905, and continues to step 910, where, as Signed and Sealed this
Fourteenth Day of May, 2024

Katherine Kelly Vidal
*Director of the United States Patent and Trademark Office*